United States Patent [19]

Kawasaki

[11] 4,189,221
[45] Feb. 19, 1980

[54] ELECTRICAL SHUTTER CIRCUIT
[75] Inventor: Masahiro Kawasaki, Tokyo, Japan
[73] Assignee: Asahi Kogaku Kogyo Kabushiki Kaisha, Tokyo, Japan
[21] Appl. No.: 876,372
[22] Filed: Feb. 9, 1978
[30] Foreign Application Priority Data
  Mar. 2, 1977 [JP] Japan .................................. 52-22361
[51] Int. Cl.² .......................... G03B 7/08; G03B 17/18
[52] U.S. Cl. ........................................ 354/51; 354/58; 354/289
[58] Field of Search ................... 354/23 R, 28, 37, 51, 354/58, 60 R, 50, 289; 356/215, 218, 224, 226; 250/214 P

[56] References Cited
U.S. PATENT DOCUMENTS

| 3,687,026 | 8/1972 | Kobayashi et al. ..................... 354/51 |
| 3,727,526 | 4/1973 | Hinds ..................... 354/51 |
| 3,956,763 | 5/1976 | Yamanaka ............................... 354/58 |

Primary Examiner—L. T. Hix
Assistant Examiner—William B. Perkey
Attorney, Agent, or Firm—Sughrue, Rothwell, Mion, Zinn and Macpeak

[57] ABSTRACT

An electrical shutter control circuit of the type which is integrated directly is disclosed. The light receiving element is connected across the input terminals of an operational amplifier, and a switch connects one of at least two integrating capacitors between the output and the inverting input of the operational amplifier. The switch is switched in accordance with a selected ASA sensitivity range. The resistance of a variable resistor is set in accordance with a selected ASA sensitivity and is mechanically coupled with the switch. A comparator compares a voltage corresponding to a selected ASA sensitivity as determined by the resistance of the variable resistor with the integration voltage at the output of the operational amplifier to control the shutter speed. The circuit has a high accuracy throughout a wide ASA setting range and is operated by a low supply voltage.

4 Claims, 5 Drawing Figures

ELECTRICAL SHUTTER CIRCUIT

BACKGROUND OF THE INVENTION

This invention relates to an electrical shutter control circuit of the type wherein the photocurrent of a light receiving element is integrated directly.

An electrical shutter control circuit of the type that light from an object is reflected by a film surface or a shutter curtain immediately before the film, and the reflected light is measured thereby to control the shutter has been proposed in the art. In the electrical shutter control circuit of this type, in general the photocurrent of the light receiving element caused by the light from the object which has passed through the photographing lens is integrated directly. The circuit is as indicated in FIG. 1. In the circuit shown in FIG. 1, a light receiving element 1 is connected between the input terminals of an operational amplifier 4, and an integrating capacitor 3 and a timing switch 2 which is opened in synchronization with the running of a shutter's top curtain are connected between the output terminal and the inverting input terminal of the operational amplifier 4. A constant current source 6 is connected to a variable resistor 7 which is set in accordance with an ASA sensitivity. This connection point and the output terminal of the operational amplifier 4 are connected to the input terminals of a comparator 5, the output terminal of which is connected to the base of a transistor 9 operating to drive a bottom curtain controlling magnet 8. Reference numeral 10 designates an electrical power source.

In operation, the light from the object passed through the photographing lens is reflected by the surface of the film or by the surface of the shutter curtain immediately before the film and reaches the light receiving element 1 to produce photocurrent. When the timing switch 2 is closed, the photocurrent flows in the timing switch 2, and therefore the output voltage of the operational amplifier 4 is zero volts which is lower than the terminal voltage of the variable resistor 7. As a result, the output of the comparator 5 is applied, as a base current, to the transistor 9 thereby to energize the bottom curtain controlling magnet 8. When, under this condition, the timing switch 2 is opened in synchronization with the running of the shutter top curtain, the aforementioned photocurrent is integrated in the integrating capacitor 3. When the voltage of the capacitor 3 reaches the terminal voltage of the variable resistor 7, the state of the comparator 5 is inverted, as a result of which the energization of the bottom curtain controlling magnet 8 is suspended. The period of time from the opening of the timing switch 2 to the suspension of energization of the bottom curtain controlling magnet 8 is the exposure time which will give a suitable exposure to the film.

If it is assumed that the photocurrent of the light receiving element 1 is represented by $i_p$, the capacitance of the integrating capacitor 3 is represented by $C_0$, and the terminal voltage of the variable resistor 7 is represented by $V_B$, then the exposure time T can be expressed by the following equation (1):

$$T = C_0 \cdot V_B / i_p \qquad (1)$$

With respect to the object brightness B and the lens stop value A, the photocurrent $i_p$ can be expressed by the following equation (2):

$$i_p = K_0 \cdot B / A^2 \qquad (2)$$

where $K_0$ is the proportional constant.

With respect to the ASA sensitivity S, the terminal voltage $V_B$ which can be set in accordance with an ASA sensitivity can be expressed by the following equation (3):

$$V_B = K_1 / S \qquad (3)$$

where $K_1$ is the proportional constant.
Therefore, from equations (1), (2) and (3), the exposure time T can be expressed by the following equation (4):

$$T = K_2 \cdot A^2 / B \cdot S \qquad (4)$$

where $K_2 = C_0 \cdot K_1 / K_0$

Accordingly, if the value $K_2$ is suitably determined, the value T in equation (4) will be the exposure time during which the film is subject to suitable exposure. From equation (3), the terminal voltage $V_B$ of the variable resistor 7 is variable over a wide range of from 6.4 V to 3 mV or 2.1 V to about 1 mV (depending on the selection of the constant $K_1$) for an ASA sensitivity range of from 3 to 6400. For an ASA setting of 6400, the electric shutter circuit is affected by the offset voltages or drift voltages of the operational amplifier 4 and the comparator 5, and therefore the accuracy of the circuit is very low. Furthermore, it is impossible to employ a low supply voltage 10 because of the factors involved when the ASA sensitivity is set to around ASA 3.

SUMMARY OF THE INVENTION

In view of the foregoing, an object of this invention is to provide an electrical shutter circuit having a high accuracy throughout the ASA setting range which is operated on a low supply voltage and is free of the effects of the offset voltage and drift voltages of the operational amplifier and the comparator.

DESCRIPTION OF THE PREFERRED EMBODIMENTS

Figure 1:
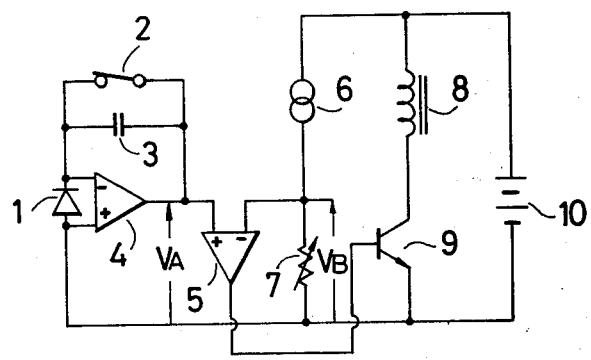
FIG. 1 is a schematic circuit diagram showing a conventional electrical shutter circuit.
Figure 2:
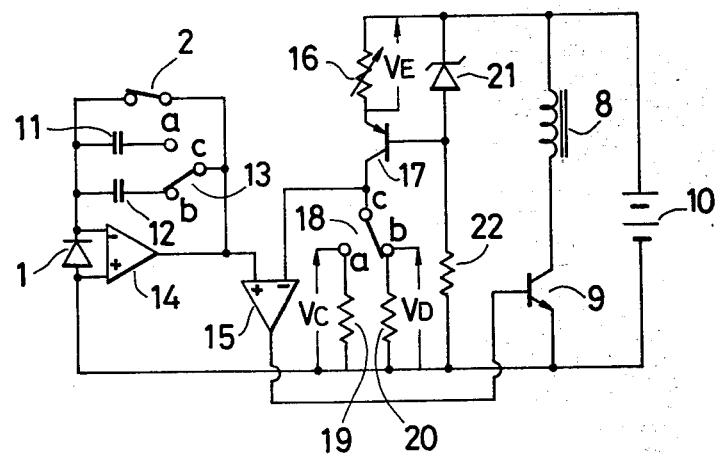
FIG. 2 is a schematic circuit diagram showing a first example of an electrical shutter circuit according to this invention.

Shown in FIG. 2 is a first example of the electrical shutter circuit according to this invention, in which those components which have been previously described with reference to FIG. 1 have been similarly numbered. In FIG. 2, integrating capacitors 11 and 12 are connected between the inverting input terminal of the operational amplifier 14 and the terminals a and b of a first switch 13, respectively, which is connected to the output terminal of the operational amplifier 14 and is switched in accordance with a selected ASA sensitivity range. A Zener diode 21 is connected to a resistor 22 to form a series circuit which is connected in parallel to the power supply 10. Connected to the connection point between the diode 21 and the resistor 22 is the base of a transistor 17. A variable resistor 16 which is set in accordance with an ASA sensitivity is connected between the emitter of the transistor 17 and the power supply 10. A second switch 18 which is switched in association with the operation of the first switch 13 which is switched in accordance with a selected ASA sensitivity range as described before, is connected to the collector of the transistor 17. Resistors 19 and 20 are connected to the terminals a and b of the switch 18. The collector of the transistor 17 and the output terminal of the operational amplifier 14 are connected to the inputs of a comparator 15.

The operation of the circuit shown in FIG. 2 will now be described. Under the conditions that the terminal c of the first switch 13 is connected to the terminal a thereof while the terminal c of the second switch 18 is connected to the terminal a thereof, the photocurrent of the light receiving element 1 is integrated by the integrating capacitor 11. On the other hand, the voltage across the variable resistor 16 is obtained by subtracting the base-emitter voltage of the transistor 17 from the terminal voltage of the constant voltage Zener diode 21, that is, it is a constant voltage $V_E$. With respect to an ASA sensitivity S, the resistance $R_S$ of the variable resistor 16 is set so as to satisfy the following equation (5):

$$R_S = K_3 \cdot S \qquad (5)$$

where $K_3$ is the proportional constant.
Then, the collector current $i_c$ of the transistor 17 can be expressed by the following equation (6):

$$i_c = V_E/R_S = V_E/(K_3 \cdot S) \qquad (6)$$

Furthermore, if it is assumed that the capacitance of the integrating capacitor 11 is represented by $C_1$, and the resistance of the resistor 19 is represented by $R_1$, then similarly as in the case of FIG. 1 the exposure time T is:

$$T = C_1 \cdot V_C/i_p = (C_1 \cdot R_1 \cdot V_E/K_0 \cdot K_3)A^2/B \cdot S \qquad (7)$$

where $V_C$ is the voltage at the terminal a of the second switch 18.

On the other hand, under the condition that the terminals c of the first and second switches 13 and 18 are connected to the terminals b thereof, respectively, if the capacitance of the integrating capacitor 12 and the resistance of the resistor 20 are represented by $C_2$ and $R_2$, respectively, the exposure time T is:

$$T = C_2 \cdot V_D/i_p = (C_2 \cdot R_2 \cdot V_E/K_0 \cdot K_3)A^2/B \cdot S \qquad (8)$$

where $V_D$ is the voltage at the terminal b of the second switch 18.

The condition for establishing both of the equations (7) and (8) is:

$$C_1 \cdot R_1 = C_2 \cdot R_2 \qquad (9).$$

Therefore, if the value $(C_1 \cdot R_1 \cdot V_E/K_0 \cdot K_3)$ is suitably determined, the value T in each of the equations (7) and (8) will be the exposure time during which the film is subject to suitable exposure.

If the first and second switches 13 and 18 are so designed that the terminal c is connected to the terminal a for an ASA range less than 150 and the terminal c is connected to the terminal b for an ASA range higher than 150, the voltage $V_C$ at the terminal a of the second switch 18 may cover the sensitivity range of ASA 3–150 resulting in a voltage variation ratio in the range of 1:50, while the voltage $V_D$ at the terminal b of the second switch 18 may cover the sensitivity range of ASA 150–6400 resulting in a voltage variation ratio in the range of approximately 1:42. Thus, although the variation ratio of the voltage across the variable resistor 7 is approximately 1:2100 with respect to the sensitivity range of ASA 3–6400 in the circuit shown in FIG. 1, in the circuit according to this invention the voltage variation ratio is 1:50, and the voltage at the terminal a or b of the second switch 18 is in the range of from 20 mV to 1 V. Therefore, the circuit according to the invention is not affected by the offset voltages or drift voltages of the operational amplifier 14 and the comparator 15 and can operate on a low supply voltage. For convenience in description, two change-over switches 13 and 18 are employed in the circuit shown in FIG. 2; however, they may be replaced by semiconductor switches operated by one switch.

Figure 3:
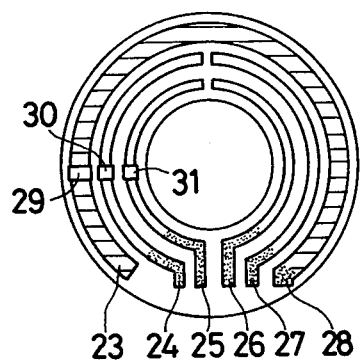
FIG. 3 is an explanatory diagram illustrating an arrangement of a variable resistor 16 and switches 13 and 18 employed in the circuit shown in FIG. 2.

FIG. 3 shows an arrangement of the variable resistor 16, and the first and second switches 13 and 18 shown in FIG. 2. In FIG. 3, a part 23 hatched by oblique lines is intended to designate a resistance section, and reference numeral 28 designates the terminal of the resistor 23. The resistance section 23, the terminal 28 and a wiper 29 from the aforementioned variable resistor 16. Reference numerals 24, 25, 26 and 27 designate conductor sections. A wiper 30 and the conductor sections 24 and 27 form the terminals c, b and a of the first switch 13. Similarly, a wiper 31 and the conductor sections 25 and 26 form the terminals c, b and a of the second switch 18.

Figure 4:
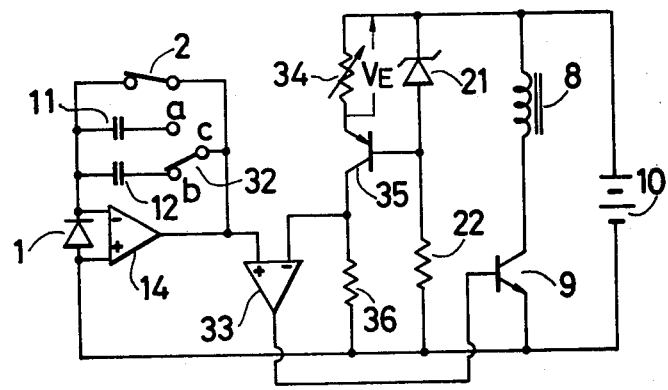
FIG. 4 is a schematic circuit diagram showing a second example of the electrical shutter circuit according to the invention.

Shown in FIG. 4 is another example of the electrical shutter circuit according to the invention, in which those components which have been described with reference to FIGS. 1 and 2 have been similarly numbered. In FIG. 4, a change-over switch 32 is switched in accordance with the selected ASA sensitivity range similarly as in the case of the first switch 13. An operational amplifier 14 and its related components are similar to those shown in FIG. 2. A variable resistor 34 which can be set in accordance with a selected ASA sensitivity is connected to the emitter of a transistor 35, and a resistor 36 is connected to the collector of transistor 35.

The operation of the circuit shown in FIG. 4 will now be described. The variable resistor 34 which is set in accordance a selected ASA sensitivity is so designed that it will have a different resistance section in response to the operation of the change-over switch 32 which is switched in accordance with the selected ASA sensitivity range. If it is assumed that the switch 32 is switched at an ASA sensitivity of N, the resistance $R_S'$ of the variable resistor 34 for an ASA sensitivity lower than N is:

$$R_S' = K_4 \cdot S \qquad (10)$$

where $K_4$ is the proportional constant.
On the other hand, the resistance $R_S''$ of the variable resistor 34 for an ASA sensitivity higher than N is:

$$R_S'' = K_4 \cdot S/N \qquad (11)$$

If it is assumed similarly as in the case of FIG. 2 that the voltage across the variable resistor 34 and the resistance of the resistor 36 are represented by $V_E$ and $R_3$, respectively, then under the condition that the ASA sensitivity is lower than N, that is, the terminal a of the switch 32 is connected to the terminal c, the exposure time T can be expressed by the following equation (12):

$$T=(C_1 \cdot R_3 \cdot V_E/K_4 \cdot K_0)A^2/B \cdot S \qquad (12)$$

On the other hand, under the condition that the terminal b of the switch 32 is connected to the terminal c, that is, the ASA sensitivity is higher than N, the exposure time T can be expressed by the following equation (13):

$$T=(C_2 \cdot R_3 \cdot V_E/K_4 \cdot K_0)A^2/B \cdot S \qquad (13)$$

The condition for simultaneously establishing equations (12) and (13) is:

$$C_1 = C_2 \cdot N \qquad (14)$$

If the value $(C_1 \cdot R_3 \cdot V_E/K_4 \cdot K_0)$ is suitably determined, then the value T in equations (12) and (13) will be the exposure time during which the film is subject to suitable exposure. In this case also, similarly as in the case of FIG. 2, the variation ratio of the voltage across the resistor 36 may be of the order of 1:50 for the ASA range of 3-6400, and the same effect can be obtained.

Figure 5:
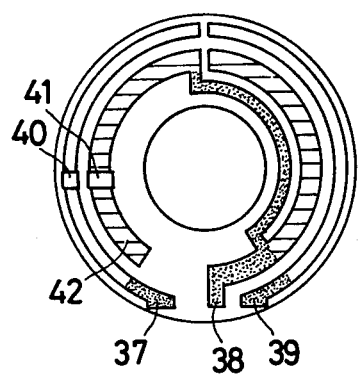
FIG. 5 is an explanatory diagram showing an arrangement of a variable resistor 34 and a switch 32 employed in the circuit shown in FIG. 4.

FIG. 5 shows an arrangement of the variable resistor 34 and the switch 32 shown in FIG. 4. In FIG. 5, reference numeral 42 is intended to designate a resistance section, and reference numeral 38 designates the terminal of the resistance section 42. The resistance section 42, the terminal 38 and a wiper 41 form the aforementioned resistor 34. Conductor sections 37 and 39 and a wiper 40 form the terminals b, a and c of the switch 32.

As is apparent from the above description, according to the invention, the variable resistor which can be set in accordance with a selected ASA sensitivity selected and the switch which is switched in accordance with a selected ASA sensitivity range are provided, and by selectively using the integrating capacitor in response to the operation of the switch the comparison voltage range for ASA sensitivity can be decreased. Therefore, the electrical shutter circuit according to the invention can operate on a low supply voltage and is not affected by the offset voltages or drift voltages of the operational amplifier and the comparator. Thus, the circuit according to the invention is very high in accuracy. Furthermore, the range of ASA sensitivity employable can be increased.

What is claimed is:

1. An analog electrical shutter circuit comprising:
   a light receiving element;
   an operational amplifier for applying a biasing voltage of approximately zero volts to said light receiving element;
   a switch which is switched in accordance with a selected ASA sensitivity range;
   at least two integrating capacitors which are selectively connected between the output and the input of said operational amplifier in response to the operation of said switch and in accordance with a selected range of ASA sensitivity;
   at least two resistance elements;
   means for selecting one of said at least two resistance elements in accordance with a selected range of ASA sensitivity, said means for selecting being mechanically coupled to said switch;
   means for supplying a current through said selected resistance elements;
   means for adjusting the magnitude of said supply current in accordance with a desired range of received light; and
   a comparator for comparing a voltage corresponding to a desired quantity of received light, as determined by said supplied current and said selected resistance element, to the integration voltage of a selected one of said integrating capacitors to control the shutter speed, whereby, the range of voltages received by said capacitor is decreased.

2. An electrical shutter circuit as claimed in claim 1, wherein said means for adjusting is a variable resistor and said variable resistor, resistance elements, means for selecting and said switch which is switched in accordance with a selected ASA sensitivity range are formed on one and the same substrate, and the wiper of said variable resistor, the armature of said switch and said means for selecting are operated in association with each other.

3. An electrical shutter circuit as claimed in claim 1, wherein said first and second resistance elements form a single variable resistor divided into at least two parts in such a manner that the division point corresponds to the switching point of said switch the wiper of said variable resistor being movable along either of said resistance elements to determine the current therethrough.

4. An electrical shutter circuit as claimed in claim 3, wherein said single variable resistor determines the magnitude of current supplied from a constant current source, wherein a fixed resistor connected in series with said constant current source supplies to the comparator the voltage corresponding to a desired quantity of received light, a first of said at least two parts providing a first range of current values corresponding to the range of voltages provided by a first of said at least two integrating capacitors and a second of said at least two parts providing a second range of current values corresponding to the range of voltages provided by a second of said at least two integrating capacitors, the desired quantity of received light being determined by the selected resistance element upon which said wiper is being moved and the precise position of the wiper on that resistance element, whereby the range of voltages received by said comparator is decreased.

* * * * *